US009961621B2

(12) United States Patent
Wei

(10) Patent No.: US 9,961,621 B2
(45) Date of Patent: May 1, 2018

(54) WIRELESS CUSTOMER PREMISE EQUIPMENT AND ACCESS METHOD THEREFOR

(71) Applicant: ZTE Corporation, Shenzhen (CN)

(72) Inventor: Jianbin Wei, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 104 days.

(21) Appl. No.: 15/022,541

(22) PCT Filed: Apr. 21, 2014

(86) PCT No.: PCT/CN2014/075835
§ 371 (c)(1),
(2) Date: Mar. 16, 2016

(87) PCT Pub. No.: WO2015/039436
PCT Pub. Date: Mar. 26, 2015

(65) Prior Publication Data
US 2016/0242104 A1 Aug. 18, 2016

(30) Foreign Application Priority Data

Sep. 17, 2013 (CN) .......................... 2013 1 0425872

(51) Int. Cl.
H04W 48/16 (2009.01)
H04W 88/06 (2009.01)
H04W 84/12 (2009.01)
(52) U.S. Cl.
CPC ........... *H04W 48/16* (2013.01); *H04W 88/06* (2013.01); *H04W 84/12* (2013.01)
(58) Field of Classification Search
None
See application file for complete search history.

(56) References Cited

U.S. PATENT DOCUMENTS 6,028,984 A * 2/2000 Kimball ............... G06F 13/385
370/401
7,181,236 B1 * 2/2007 Truong ................. G06F 1/3209
375/222

(Continued)

FOREIGN PATENT DOCUMENTS

CN 201278534 Y 7/2009
CN 101710860 A 5/2010

(Continued)

OTHER PUBLICATIONS

International Search Report in international application No. PCT/CN2014/075835, dated Jul. 14, 2014.

(Continued)

*Primary Examiner* — Hicham Foud
(74) *Attorney, Agent, or Firm* — Oppedahl Patent Law Firm, LLC

(57) ABSTRACT

Wireless CPE and an access method therefor are provided. The wireless CPE includes a control subsystem, an access subsystem, and an interface and control module arranged therebetween. The interface and control module is configured to provide a communication link between the control subsystem and the access subsystem when no master equipment accesses the interface and control module, otherwise, disconnect the communication link between the control subsystem and the access subsystem and provide a communication link between the access subsystem and master equipment. Thus, some users can exclusively enjoy wireless broadband resources while some users use wired broadband resources without additional cost.

8 Claims, 4 Drawing Sheets

(56) References Cited

U.S. PATENT DOCUMENTS

| | | | |
|---|---|---|---|
| 7,383,062 B1 * | 6/2008 | On | H04B 1/3816 |
| | | | 359/237 |
| 7,512,131 B2 | 3/2009 | Svensson | |
| 2005/0185656 A1 | 8/2005 | Svensson | |
| 2015/0237567 A1 | 8/2015 | Xue | |

FOREIGN PATENT DOCUMENTS

| | | |
|---|---|---|
| CN | 102833878 A | 12/2012 |
| EP | 2887759 A1 | 6/2015 |

OTHER PUBLICATIONS

English Translation of the Written Opinion of the International Search Authority in international application No. PCT/CN2014/075835, dated Jul. 14, 2014.

Supplementary European Search Report in European application No. 14845237.8, dated Aug. 8, 2016.

* cited by examiner

WIRELESS CUSTOMER PREMISE EQUIPMENT AND ACCESS METHOD THEREFOR

TECHNICAL FIELD

The present disclosure relates to a wireless access technology in the field of communications, and in particular to wireless Customer Premise Equipment (CPE) and an access method therefor.

BACKGROUND

With the rapid development of mobile broadband technologies and services, wireless CPE providing a wireless internet function for personal, household or small enterprise users emerges.

Conventional wireless CPE includes a control subsystem and an access subsystem, wherein the control subsystem may further include a first processing module, an Ethernet interface module, a Wireless Fidelity (WiFi) module, and a first interface control and driver and is configured to establish a WiFi local area network, invoke a background processing program after pre-set input parameters are received, and perform conversion to generate an ATtention (AT) command and the like; the access subsystem may further include a second processing module, a radio frequency module, a telephone interface module, a power management module, and a second interface control and driver and is configured to access a wireless broadband signal, parse the AT command which passes through a Universal Serial Bus (USB) interface and comes from the control subsystem, and invoke relevant internal functions so as to connect a user terminal to a network or disconnect the user terminal from the network.

The conventional wireless CPE can realize accessing of a wired or wireless broadband by settings, and can realize a function that multiple customer terminals simultaneously access the internet by establishing a local area network, and users using wired broadband resources can enjoy cheap prices; however, if it is expected that some users can exclusively enjoy wireless broadband resources while some users use the wired broadband resources, then the use of the wireless CPE only cannot make it come true currently. A combination mode of a wireless router and a data card or a plurality of pieces of wireless CPE is not cost-effective economically, and the cost is relatively high.

SUMMARY

The embodiments of the present disclosure provide wireless CPE and an access method therefor, which are used to solve the technical problems existing currently.

An embodiment of the present disclosure provides wireless CPE, which may include a control subsystem and an access subsystem. The wireless CPE may further include an interface and control module arranged between the control subsystem and the access subsystem.

The interface and control module may be configured to provide a communication link between the control subsystem and the access subsystem when no master equipment accesses the interface and control module, and disconnect the communication link between the control subsystem and the access subsystem and provide a communication link between the access subsystem and master equipment when the master equipment accesses the interface and control module.

In the solution, the interface and control module may exist independently from the control subsystem and the access subsystem, or may be integrated inside the access subsystem.

In the solution, the interface and control module may further include an analogue switch and a high speed interface, wherein the analogue switch is configured to control the access subsystem to be communicated with the control subsystem or control the access subsystem to be communicated with master equipment accessing the high speed interface; and the high speed interface is configured to identify via a signal line of the high speed interface whether the master equipment accesses the high speed interface, and inform the analogue switch.

In the solution, the analogue switch may be configured to automatically disconnect the access subsystem from the control subsystem when the high speed interface detects that the master equipment accesses the high speed interface, and control the access subsystem to be connected to the master equipment.

In the solution, the analogue switch may be a switch device.

An embodiment of the present disclosure also provides an access method for wireless CPE, including arranging an interface and control module between a control subsystem and an interface subsystem. The method may further include that:

it is detected whether master equipment accesses the interface and control module, if no master equipment accesses the interface and control module, the interface and control module provides a communication link between the control subsystem and the access subsystem, and otherwise, if there is master equipment accessing the interface and control module, the interface and control module disconnects the communication link between the control subsystem and the access subsystem and provides a communication link between the access subsystem and the master equipment.

In the solution, when the master equipment accesses the interface and control module, the method may further include that: the control subsystem determines whether wired broadband resources or wireless broadband resources are accessed; if the wired broadband resources are accessed, equipment accessing the control subsystem to establish a local area network shares the wired broadband resources, and the master equipment accesses a wireless broadband and exclusively enjoys the wireless broadband resources; otherwise, the equipment accessing the control subsystem to establish the local area network disconnects from broadband resources, and the master equipment accesses the wireless broadband and exclusively enjoys the wireless broadband resources.

According to the wireless CPE and the access method therefor provided by the embodiments of the present disclosure, an interface and control module is arranged between a control subsystem and an access subsystem; when no master equipment accesses the interface and control module, a communication link between the control subsystem and the access subsystem is provided; and when master equipment accesses the interface and control module, the communication link between the control subsystem and the access subsystem is disconnected, and a communication link between the access subsystem and the master equipment is provided. Thus, special purposes under personal environments, household environments, small enterprise environments and other environments may be met to the greatest extent; and moreover, it may be realized that some users can exclusively enjoy wireless broadband internet resources while some users use wired broadband internet resources without adding an additional cost.

DETAILED DESCRIPTION

In an embodiment of the present disclosure, an interface and control module is arranged between a control subsystem and an access subsystem; when no master equipment accesses the interface and control module, a communication link between the control subsystem and the access subsystem is provided; and when master equipment accesses the interface and control module, the communication link between the control subsystem and the access subsystem is disconnected, and a communication link between the access subsystem and the master equipment is provided.

The present disclosure is further described below with reference to the drawings and the embodiments in detail.

Figure 1:
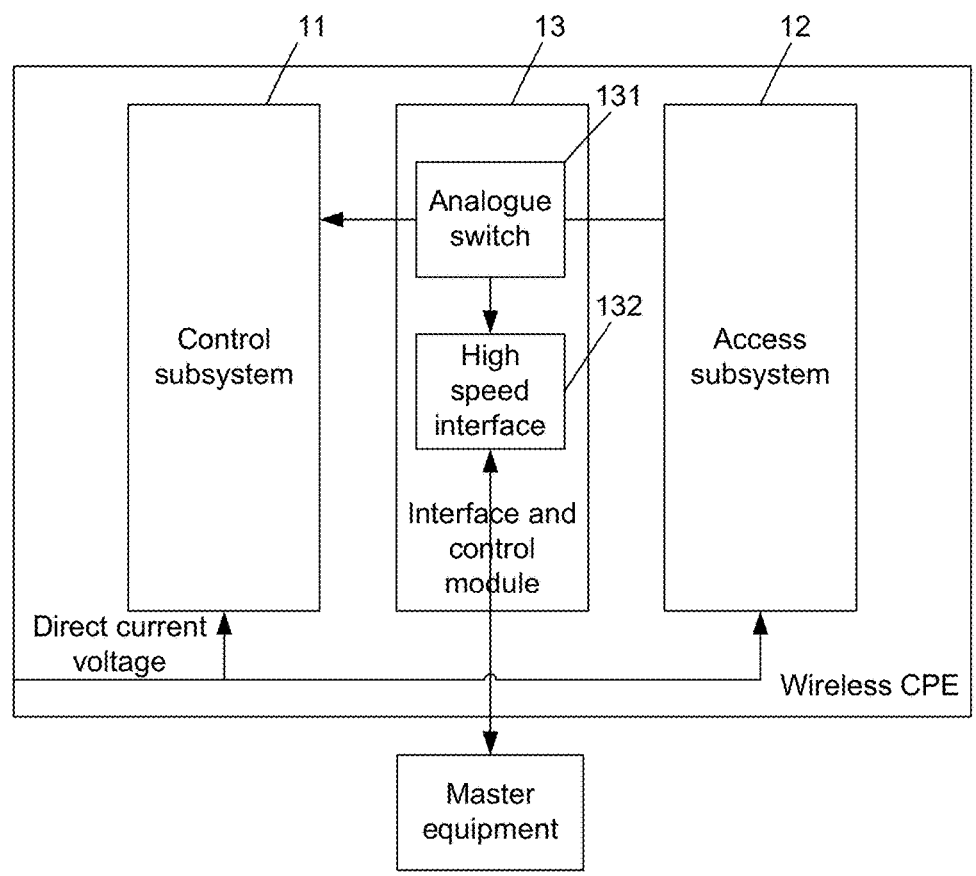
FIG. 1 is a schematic diagram of a basic composition structure of wireless CPE according to an embodiment of the present disclosure.

FIG. 1 is a schematic diagram of a basic composition structure of wireless CPE according to an embodiment of the present disclosure. As shown in FIG. 1, a composition structure of the wireless CPE includes a control subsystem 11, an access subsystem 12, and an interface and control module 13 arranged between the control subsystem 11 and the access subsystem 12, wherein the interface and control module 13 is configured to provide a communication link between the control subsystem 11 and the access subsystem 12 when no master equipment accesses the interface and control module, and disconnect the communication link between the control subsystem 11 and the access subsystem 12 and provide a communication link between the control subsystem 12 and master equipment when the master equipment accesses the interface and control module.

In the embodiment, the interface and control module 13 is arranged independently from the control subsystem 11 and the access subsystem 12.

The interface and control module 13 includes an analogue switch 131 and a high speed interface 132, wherein the analogue switch 131 is configured to control communication between the access subsystem 12 and the control subsystem 11 or control communication between the access subsystem 12 and the master equipment accessing the high speed interface 132;

the high speed interface 132 is configured to identify accessing of the master equipment, and inform the analogue switch 131; and preferably, the analogue switch 131 is configured to automatically disconnect the access subsystem 12 from the control subsystem 11 when the high speed interface 132 detects that the master equipment accesses the high speed interface, and control the access subsystem 12 to be connected to the master equipment.

Here, the analogue switch 131 may be a switch device such as a triode transistor. Switching of the switch is controlled via high and low levels; and the high speed interface 132 may be a high speed interface, such as a USB, a High Speed Inter-Chip (HSIC), a Peripheral Component Interconnect Express (PCIE) and the like, as well as a relevant equipment accessory; and the master equipment may be a Personal Computer (PC) or a laptop.

Figure 2:
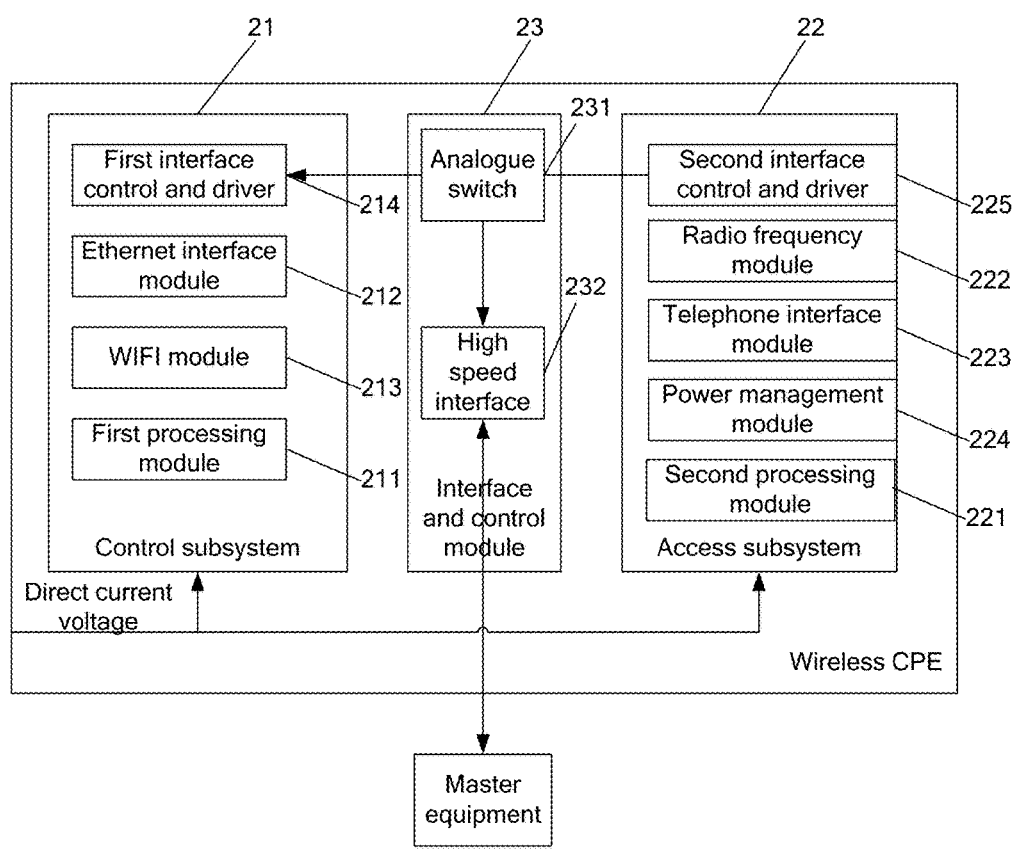
FIG. 2 is a schematic diagram of a specific composition structure of wireless CPE according to an embodiment of the present disclosure.

FIG. 2 is a schematic diagram of a detailed composition structure of wireless CPE according to an embodiment of the present disclosure. As shown in FIG. 2, a composition structure of the wireless CPE includes a control subsystem 21, an access subsystem 22, and an interface and control module 23, wherein the interface and control module 23 is arranged between the control subsystem 21 and the access subsystem 22, and independently exists with respect to the control subsystem 21 and the access subsystem 22, wherein the control subsystem 21 is configured to invoke a background processing program after input parameters coming from a user terminal are received, and perform a conversion to generate an AT command; the control subsystem 21 includes a first processing module 211, an Ethernet interface module 212, a WiFi module 213 and a first interface control and driver 214;

specifically, the first processing module 211 is configured to process information; the Ethernet interface module 212 is configured to access a wired broadband or connect to local area network access equipment via wired connection; the WiFi module 213 is configured to be wirelessly connected to local area network equipment; the first interface control and driver 214 may be a USB interface;

the access subsystem 22 is configured to parse the AT command coming from the control subsystem 21, and invoke relevant internal functions so as to connect the user terminal to a network or disconnect the user terminal from the network; the access subsystem 22 includes a second processing module 221, a radio frequency module 222, a telephone interface module 223, a power management module 224 and a second interface control and driver 225;

specifically, the second processing module 221 is configured to process information; the radio frequency module 222 is configured to receive and send a radio frequency signal, and send the received radio frequency signal to the second processing module 221 for processing; the telephone interface module 223 is configured to generate an internal ring, generate and decode multi-tone and multi-frequency, and generate a complete telephone signal; the power management module 224 is configured to manage start-up of the access subsystem 22, detect a dynamic voltage and supply power; the second interface control and driver 225 may be a USB interface;

the interface and control module 23 includes a high speed interface 232 and an analogue switch 231; the interface and control module 23 may be connected to the access subsystem 22 via the analogue switch 231 and the second interface control and driver 225 in the access subsystem 22, and may be connected to the control subsystem 21 via the analogue switch 231 and the first interface control and driver 214 in the control subsystem;

the interface and control module 23 is configured to provide a communication link between the control subsystem 21 and the access subsystem 22 when no master equipment accesses the interface and control module, and disconnect the communication link between the control subsystem 21 and the access subsystem 22 and provide a communication link between the access subsystem 22 and master equipment when the master equipment accesses the interface and control module; wherein the analogue switch 231 is configured to control the access subsystem 22 to be communicated with the control subsystem 21 by turning on a switch between the access subsystem and the first interface control and driver 214 in the control subsystem 21, or control the access subsystem 22 to be communicated with master equipment accessing the high speed interface 232 by turning on a switch between the access subsystem and the high speed interface 232;

the high speed interface 232 is configured to identify via a signal line of the high speed interface 232 whether the master equipment accesses the high speed interface, and inform the analogue switch 231;

here, the step that the communication link between the control subsystem 21 and the access subsystem 22 is provided when no master equipment accesses the interface and control module specifically includes that: the high speed interface 232 identifies via the signal line of the high speed interface 232 that no master equipment accesses the high speed interface, and the analogue switch 231 turns on a switch between the control subsystem and the second interface control and driver 225 in the access subsystem 22 to communicate the control subsystem 21 with the access subsystem 22 so as to perform data exchange;

the step that the communication link between the control subsystem 21 and the access subsystem 22 is disconnected and the communication link between the access subsystem 22 and the master equipment accessing the high speed interface 232 is provided when the master equipment accesses the interface and control module specifically includes that: the high speed interface 232 identifies via the signal line of the high speed interface 232 that the master equipment accesses the high speed interface, and the analogue switch 231 turns off the switch between the control subsystem and the second interface control and driver 225 in the access subsystem 22, and switches the switch to the high speed interface 232 to communicate the access subsystem 22 with the master equipment accessing the high speed interface 232 so as to perform data exchange between the access subsystem 22 and the master equipment accessing the high speed interface 232;

here, the analogue switch 231 may be a switch device such as a triode transistor. Switching of the switch is controlled via high and low levels;

the high speed interface 232 may be a USB, an HSIC, a PCIE and other high speed interface and relevant equipment accessory; and the master equipment may be a PC or a laptop; and here, under the condition that the control subsystem 21 accesses wired broadband resources when the master equipment is a PC or a laptop, users in a local area network established by the control subsystem 21 share the wired broadband resources, the PC or the laptop may be connected to the access subsystem 22 via the high speed interface 232 in the interface and control module 23, and exclusively enjoys wireless broadband resources, thus special purposes under personal environments, household environments, small enterprise environments and other environments are met to the greatest extent, and moreover, it can be realized that some users can exclusively enjoy wireless broadband internet resources while some users use wired broadband internet resources without adding an additional cost.

Figure 3:
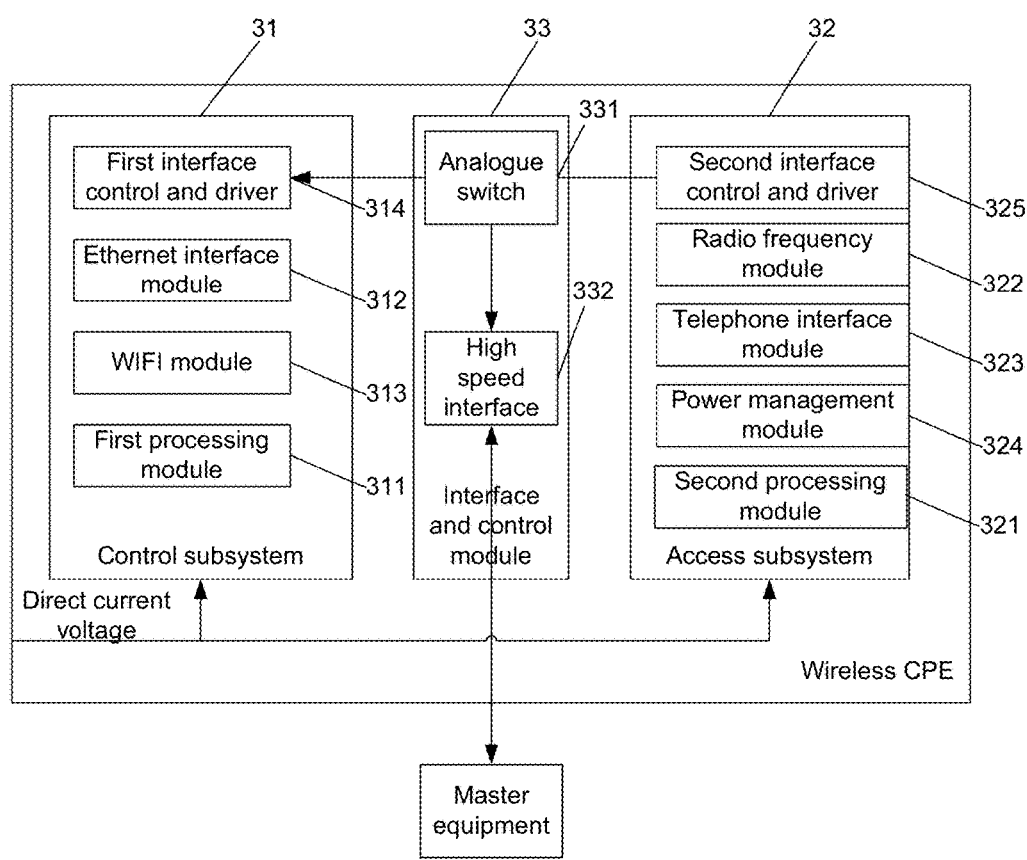
FIG. 3 is a schematic diagram of another specific composition structure of wireless CPE according to an embodiment of the present disclosure.

FIG. 3 is a schematic diagram of another specific composition structure of wireless CPE according to an embodiment of the present disclosure. As shown in FIG. 3, a composition structure of the wireless CPE includes a control subsystem 31, an access subsystem 32, and an interface and control module 33, wherein the interface and control module 33 is arranged between the control subsystem 31 and the access subsystem 32, and is integrated inside the access subsystem 32, wherein the control subsystem 31 is configured to invoke a background processing program after input parameters coming from a user terminal are received, and perform conversion to generate an AT command and the like; the control subsystem 31 includes a first processing module 311, an Ethernet interface module 312, a WiFi module 313 and a first interface control and driver 314;

specifically, the first processing module 311 is configured to process information; the Ethernet interface module 312 is configured to access a wired broadband or to be connected to local area network access equipment via wired connection; the WiFi module 313 is configured to be wirelessly connected to local area network equipment; the first interface control and driver 314 may be a USB interface;

the access subsystem 32 is configured to parse the AT command coming from the control subsystem, and invoke relevant internal functions so as to connect the user terminal to a network or disconnect the user terminal from the network; the access subsystem 32 includes a second processing module 321, a radio frequency module 322, a telephone interface module 323, a power management module 324 and a second interface control and driver 325;

specifically, the second processing module 321 is configured to process information; the radio frequency module 322 is configured to receive and send a radio frequency signal, and send the received radio frequency signal to the second processing module 321 for processing; the telephone interface module 323 is configured to generate an internal ring, generate and decode multi-tone and multi-frequency, and generate a complete telephone signal; the power management module 324 is configured to manage start-up of the access subsystem 32, detect a dynamic voltage and supply power; the second interface control and driver 325 may be a USB interface;

the interface and control module 33 includes a high speed interface 332 and an analogue switch 331; the interface and control module 33 may be connected to the access subsystem 32 via the analogue switch 331 and the second interface control and driver 325 in the access subsystem 32, and may be connected to the control subsystem 31 via the analogue switch 331 and the first interface control and driver 314 in the control subsystem 31; and the interface and control module 33 is configured to provide a communication link between the control subsystem 31 and the access subsystem 32 when no master equipment accesses the interface and control module, and disconnect the communication link between the control subsystem 31 and the access subsystem 32 and provide a communication link between the access subsystem 32 and master equipment when the master equipment accesses the interface and control module.

The analogue switch 331 is configured to control the access subsystem 32 to be communicated with the control subsystem 31 by turning on a switch between the access subsystem and the first interface control and driver 314 in the control subsystem 31, or control the access subsystem 32 to be communicated with master equipment accessing the high speed interface 332 by turning on a switch between the access subsystem and the high speed interface 332;

the high speed interface 332 is configured to identify whether the master equipment accesses the high speed interface via a signal line of the high speed interface 332, and inform the analogue switch 331;

here, the step that the communication link between the control subsystem 31 and the access subsystem 32 is provided when no master equipment accesses the interface and control module specifically includes that: the high speed interface 332 identifies via the signal line of the high speed interface 332 that no master equipment accesses the high speed interface, and the analogue switch 331 turns on a switch between the control subsystem and the second interface control and driver 325 in the access subsystem 32 to communicate the control subsystem 31 with the access subsystem 32 so as to perform data exchange;

the step that the communication link between the control subsystem 31 and the access subsystem 32 is disconnected and the communication link between the access subsystem and the master equipment accessing the high speed interface 332 is provided when the master equipment accesses the interface and control module specifically includes that: the high speed interface 332 identifies via the signal line of the high speed interface 332 that the master equipment accesses the high speed interface, and the analogue switch 331 turns off the switch between the control subsystem and the second interface control and driver 325 in the access subsystem 32, and switches the switch to the high speed interface 332 to communicate the access subsystem 32 with the master equipment accessing the high speed interface 332 so as to perform data exchange between the access subsystem 32 and the master equipment accessing the high speed interface 332;

here, the analogue switch 331 may be a switch device such as a triode transistor. Switching of the switch is controlled via high and low levels;

the high speed interface 332 may be a USB, an HSIC, a PCIE and other high speed interface and relevant equipment accessory, and the master equipment may be a PC or a laptop; and here, under the condition that the control subsystem accesses wired broadband resources when the master equipment is a PC or a laptop, users in a local area network established by the control subsystem share the wired broadband resources, the PC or the laptop may be connected to the access subsystem via the high speed interface in the interface and control module, and exclusively enjoys wireless broadband resources, thus special purposes under personal environments, household environments, small enterprise environments and other environments are met to the greatest extent, and moreover, it can be realized that some users can exclusively enjoy wireless broadband internet resources while some users use wired broadband internet resources without adding an additional cost.

On the basis of the wireless CPE as shown in FIG. 2 or FIG. 3, an embodiment of the present disclosure provides an access method for wireless CPE, which includes that:

step A: an interface and control module is arranged between a control subsystem and an interface subsystem; and step B: it is detected whether master equipment accesses the interface and control module; if no master equipment accesses the interface and control module, then the interface and control module provides a communication link between the control subsystem and the access subsystem; otherwise, the interface and control module disconnects the communication link between the control subsystem and the access subsystem and provides a communication link between the access subsystem and the master equipment.

Figure 4:
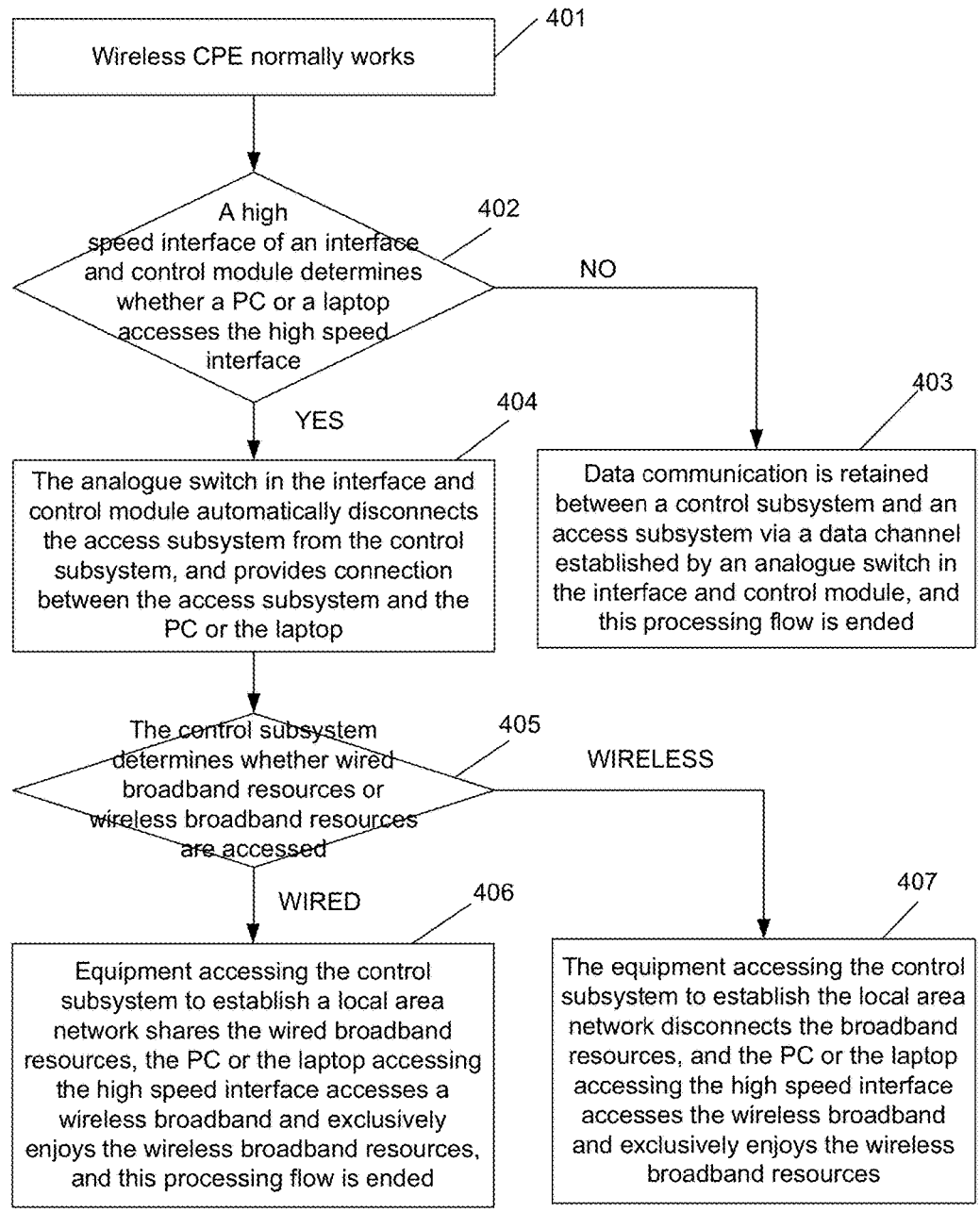
FIG. 4 is a flowchart of a method for providing wired and wireless access by wireless CPE according to an embodiment of the present disclosure.

Here, a specific processing flow of step B is as shown in FIG. 4, and a method for providing wired and wireless access by wireless CPE according to an embodiment of the present disclosure includes that:

step 401: wireless CPE normally works;

here, the step that the wireless CPE normally works refers to that the control subsystem is communicated with the access subsystem via an analogue switch of the interface and control module, and data exchange is performed;

step 402: a high speed interface of the interface and control module determines whether a PC or a laptop accesses the high speed interface; if the PC or the laptop accesses the high speed interface, then step 404 is executed; otherwise, step 403 is executed;

here, the step that the high speed interface of the interface and control module determines whether the PC or the laptop accesses the high speed interface specifically includes that: the high speed interface detects via a signal line of the high speed interface whether the PC or the laptop accesses the high speed interface;

here, the high speed interface may be a USB, an HSIC, a PCIE and other high speed interface and relevant equipment accessory;

step 403: data communication is retained between the control subsystem and the access subsystem via a data channel established by the analogue switch in the interface and control module, and this processing flow is ended;

here, the step that the data communication is retained between the control subsystem and the access subsystem via the data channel established by the interface and control module specifically includes that: the analogue switch in the interface and control module turns on a switch between the access subsystem and the first interface control and driver in the control subsystem to exchange data between the access subsystem and the control subsystem;

here, the first interface control and driver may be a USB interface; and here, the analogue switch may be a switch device such as a triode transistor. Switching of the switch is controlled via high and low levels;

step 404: the analogue switch in the interface and control module automatically disconnects the access subsystem from the control subsystem, and provides connection between the access subsystem and the PC or the laptop;

here, the step that the access subsystem is disconnected from the control subsystem and the connection between the access subsystem and the PC or the laptop is provided specifically includes that: the analogue switch in the interface and control module turns off the switch between the access subsystem and the first interface control and driver in the control subsystem, and switches the switch to the high speed interface to communicate the access subsystem with the master equipment accessing the high speed interface so as to perform data exchange;

step 405: the control subsystem determines whether wired broadband resources or wireless broadband resources are accessed; if the wired broadband resources are accessed, step 406 is executed, and if the wireless broadband resources are accessed, step 407 is executed;

step 406: equipment accessing the control subsystem to establish a local area network shares the wired broadband resources, the PC or the laptop accessing the high speed interface accesses a wireless broadband and exclusively enjoys the wireless broadband resources, and this processing flow is ended; and step 407: the equipment accessing the control subsystem to establish the local area network disconnects from the broadband resources, and the PC or the laptop accessing the high speed interface accesses the wireless broadband and exclusively enjoys the wireless broadband resources.

Those skilled in the art should understand that the embodiments of the present disclosure can provide a method, a system or a computer program product. Thus, hardware embodiments, software embodiments or embodiments integrating software and hardware may be adopted in the present disclosure. Moreover, a computer program product implemented on one or more computer available storage media (including, but not limited to, a disk memory, an optical memory and the like) containing computer available program codes may be adopted in the present disclosure.

The present disclosure is described with reference to flowcharts and/or block diagrams of the method, the equipment (system) and the computer program product according to the embodiments of the present disclosure. It should be understood that each flow and/or block in the flowcharts and/or the block diagrams and a combination of the flows and/or the blocks in the flowcharts and/or the block diagrams may be realized by computer program instructions. These computer program instructions may be provided for a general computer, a dedicated computer, an embedded processor or processors of other programmable data processing devices to generate a machine, so that an apparatus for realizing functions assigned in one or more flows of the flowcharts and/or one or more blocks of the block diagrams is generated via instructions executed by the computers or the processors of the other programmable data processing devices.

These computer program instructions may also be stored in a computer readable memory capable of guiding the computers or the other programmable data processing devices to work in a specific mode, so that a manufactured product including an instruction apparatus is generated via the instructions stored in the computer readable memory, and the instruction apparatus realizes the functions assigned in one or more flows of the flowcharts and/or one or more blocks of the block diagrams.

These computer program instructions can also be loaded to the computers or the other programmable data processing devices, so that processing realized by the computers is generated by executing a series of operation steps on the computers or other programmable devices, and therefore the instructions executed on the computers or the other programmable devices provide a step of realizing the functions assigned in one or more flows of the flowcharts and/or one or more blocks of the block diagrams.

The above is only preferred embodiments of the present disclosure, and is not intended to limit the protection scope of the present disclosure.

What is claimed is:

1. Wireless Customer Premise Equipment (CPE), comprising a control subsystem and an access subsystem; the wireless CPE further comprising an interface and control device arranged between the control subsystem and the access subsystem, wherein
the interface and control device, comprising a switch device and a high speed interface, is for providing a communication link between the control subsystem and the access subsystem when no master equipment accesses the interface and control device, and disconnecting the communication link between the control subsystem and the access subsystem and providing a communication link between the access subsystem and master equipment when the master equipment accesses the interface and control device.

2. The wireless CPE according to claim 1, wherein the interface and control device exists independently from the control subsystem and the access subsystem, or is integrated inside the access subsystem.

3. The wireless CPE according to claim 2, wherein
the switch device is for controlling the access subsystem to be communicated with the control subsystem or controlling the access subsystem to be communicated with master equipment accessing the high speed interface; and
the high speed interface is for identifying via a signal line of the high speed interface whether the master equipment accesses the high speed interface, and inform the switch device.

4. The wireless CPE according to claim 3, wherein the switch device is for automatically disconnecting the access subsystem from the control subsystem when the high speed interface detects that the master equipment accesses the high speed interface, and controlling the access subsystem to be connected to the master equipment.

5. The wireless CPE according to claim 1, wherein
the switch device is for controlling the access subsystem to be communicated with the control subsystem or controlling the access subsystem to be communicated with master equipment accessing the high speed interface; and
the high speed interface is for identifying via a signal line of the high speed interface whether the master equipment accesses the high speed interface, and inform the switch device.

6. The wireless CPE according to claim 5, wherein the switch device is for automatically disconnecting the access subsystem from the control subsystem when the high speed interface detects that the master equipment accesses the high speed interface, and controlling the access subsystem to be connected to the master equipment.

7. An access method for Wireless Customer Premise Equipment (CPE), comprising arranging an interface and control device between a control subsystem and an access subsystem, the interface and control device comprising a switch device and a high speed interface, the method further comprising:
detecting whether master equipment accesses the interface and control device; if no master equipment accesses the interface and control device, then providing, by the interface and control device, a communication link between the control subsystem and the access subsystem, otherwise, if there is master equipment accessing the interface and control device, disconnecting, by the interface and control device, the communication link between the control subsystem and the access subsystem and providing a communication link between the access subsystem and the master equipment.

8. The access method according to claim 7, further comprising: when the master equipment accesses the interface and control device,
determining, by the control subsystem, whether wired broadband resources or wireless broadband resources are accessed; if the wired broadband resources are accessed, then sharing, by equipment accessing the control subsystem to establish a local area network, the wired broadband resources, and accessing, by the master equipment, a wireless broadband, and exclusively enjoying the wireless broadband resources; otherwise, disconnecting from, by the equipment accessing the control subsystem to establish the local area network, broadband resources, and accessing, by the master equipment, the wireless broadband, and exclusively enjoying the wireless broadband resources.

\* \* \* \* \*